United States Patent
Campini et al.

(10) Patent No.: US 7,941,699 B2
(45) Date of Patent: May 10, 2011

(54) DETERMINING A SET OF PROCESSOR CORES TO BOOT

(75) Inventors: Edoardo Campini, Mesa, AZ (US); Shailesh Chaudhry, Chandler, AZ (US); Frank Geoffrey Gates, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 12/054,329

(22) Filed: Mar. 24, 2008

(65) Prior Publication Data

US 2009/0240979 A1 Sep. 24, 2009

(51) Int. Cl.
*G06F 11/00* (2006.01)
(52) U.S. Cl. .................... 714/13; 713/1; 713/2
(58) Field of Classification Search .............. 714/13, 714/36; 713/1, 2
See application file for complete search history.

(56) References Cited

U.S. PATENT DOCUMENTS

| | | | |
|---|---|---|---|
| 6,550,020 B1 * | 4/2003 | Floyd et al. ............. | 714/10 |
| 7,055,060 B2 | 5/2006 | Nguyen et al. | |
| 7,290,169 B2 * | 10/2007 | Safford et al. .......... | 714/11 |
| 7,353,375 B2 * | 4/2008 | Cepulis .................. | 713/1 |
| 7,472,266 B2 * | 12/2008 | Kumar et al. ........... | 713/1 |
| 2004/0221196 A1 * | 11/2004 | Datta et al. ............ | 714/13 |
| 2004/0230865 A1 * | 11/2004 | Balazich et al. ........ | 714/13 |
| 2005/0015661 A1 * | 1/2005 | Vaidyanathan .......... | 714/13 |
| 2005/0022059 A1 * | 1/2005 | Wei ...................... | 714/36 |
| 2005/0240811 A1 | 10/2005 | Safford et al. | |
| 2005/0240829 A1 * | 10/2005 | Safford et al. .......... | 714/43 |
| 2007/0283137 A1 * | 12/2007 | Ueltschey et al. ....... | 713/1 |
| 2007/0288738 A1 * | 12/2007 | Dale et al. .............. | 713/2 |

OTHER PUBLICATIONS

William Bryg, "The UltraSPARC T1 Processor-Reliability, Availability, and Serviceability", Sun Microsystems, Dec. 2005, Sun Microsystems, Inc. Santa Clara, CA, USA, 9 pages.
Ohsai Hamada, "High-Reliability Technology of Mission-Critical IA Server PRIMEQUEST", fujitsu Sci. Tech.J., 41,3,p. 284-290, Oct. 2005.
Intel Corporation, "Multi Processor Specification", Version 1.4, May 1997, 97 pages.
Jon Stokes, "Intel Boosts Itanium Line with Montvale", Ars Technica, the art of technology, Oct. 31, 2007, http://arstechnica.com/news.ars/post/20071031-intel-boosts-itanium-line-with-montvale.html, last accessed Mar. 21, 2008. 3 pages.
Robert Hillman et al., "Adaptive Fault-Tolerant Computer Capable of Error-Free Operation During solar Flares", Maxwell Technologies, San Diego, California, Jan. 1, 2004, 2 pages.
Nhon Quach, "High Availability And Reliability In The Itanium Processor", IEEE Micro, Sep.-Oct. 2000, pp. 61-69.
Carol A. Babikyan, "The Fault Tolerant Parallel Processor Operating System Concepts And Performance Measurement Overview", IEEE, 1990, pp. 366-391.
Bill Krause, "Use Processor Redundancy for Maximum Reliability", CommsDesign, Feb. 1, 2002, 7 pages. http://www.commsdesign.com/article/printableArticle.jhtml?articleID=16504011, last accessed Mar. 21, 2008. "OMAP5912 Applications Processor", Literature No. SPRS31E, Dec. 2003, 269 Pages.
"OMAP5910 Dual-Core Processor Functional and Peripheral Overview", Literature No. SPRU602C, Jan. 2003 70 Pages.
"TMS320VC5441 Fixed-Point Digital Signal Processor", Literature No. SPRS122E, Dec. 1999, 86 Pages.

* cited by examiner

*Primary Examiner* — Yolanda L Wilson

(57) ABSTRACT

Techniques that determine a strict subset of multiple processor cores from a set of multiple functional processor cores integrated within a single integrated circuit package. The determined strict subset of multiple processor cores differs from a previously determined strict subset of multiple processor cores from the set of multiple functional processor cores used to initiate an immediately previous core booting. In response to a processor reset, booting of the strict subset of multiple processor cores is initiated. Also, support for selecting multiple modes of operations, either supporting fault tolerance or extended life.

19 Claims, 4 Drawing Sheets

DETERMINING A SET OF PROCESSOR CORES TO BOOT

BACKGROUND

Microprocessors are used in a variety of HA/HR (High Availability/High Reliability) applications such as telecommunications. Generally, HA/HR applications often attempt to have 99.999% availability (dubbed "five nines"), or more simply put, less than five minutes of total down time each year. A significant factor in down time is part replacement. For example, if a microprocessor experiences failure, time is required to find and replace the defective component. HA/HR systems often feature substantial redundancy to make such equipment defects transparent to a user, however, such redundancy comes at a price. Another factor in attaining acceptable HA/HR performance is the reliability of each individual system element. In general, the overall reliability of a given system is often only as good as its least reliable component.

DETAILED DESCRIPTION

Programmable multi-core microprocessors can be found in a wide variety of equipment featured in HA/HR systems. Thus, the reliability of individual processor cores and the overall lifetime of a processor can impact the HA/HR performance attained and/or the degree of system redundancy needed to do so. FIGS. 1-4 illustrate a technique that uses core selection logic to select different strict subsets of cores within a processor across different successive processor resets. Reducing the overall "on-time" of a given core can both extend the individual core's lifetime and the overall lifetime of the processor. Additionally, the technique can help ensure that some of the most complex circuitry of a system is not the system's weakest link with respect to reliability.

Figure 1:
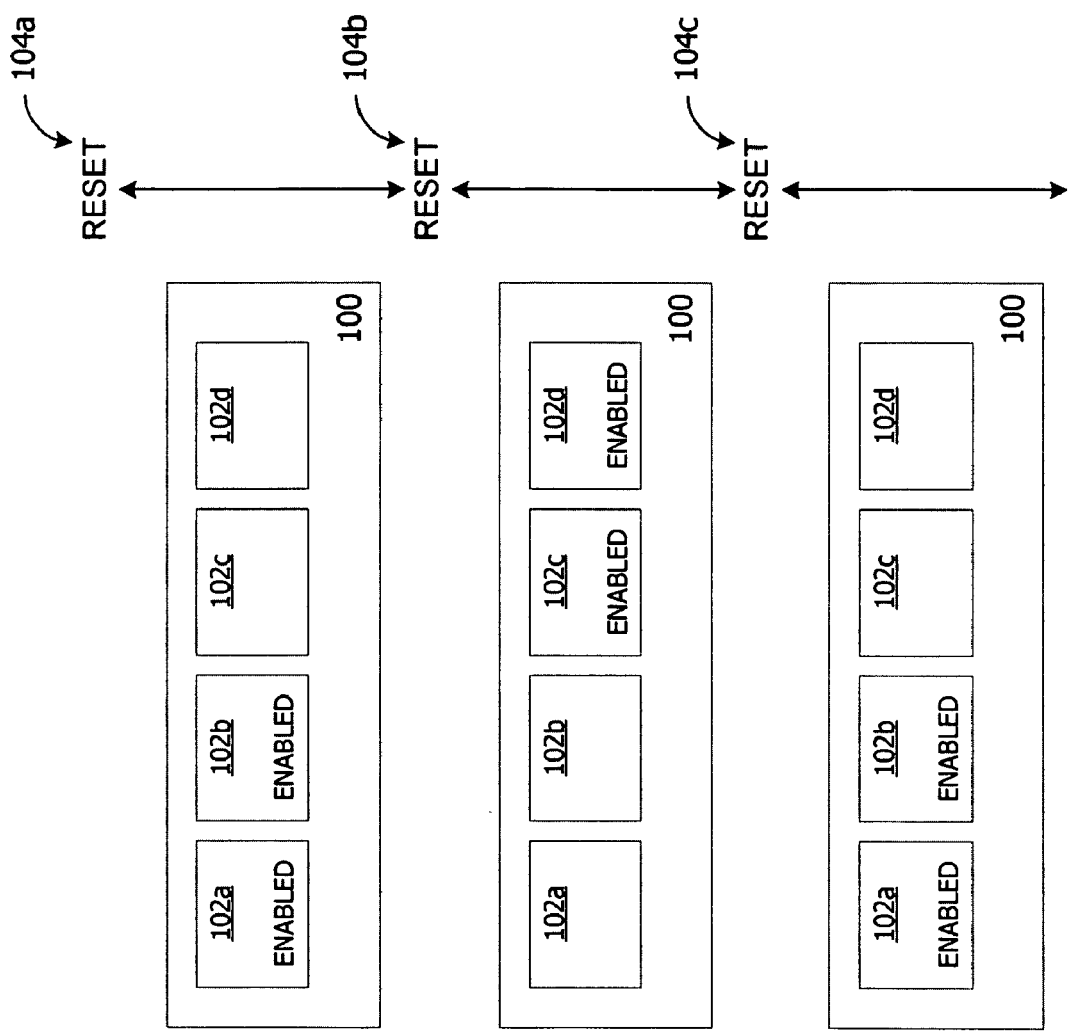
FIG. 1 is a diagram illustrating different strict subsets of processor cores booted after successive resets.

As shown, FIG. 1 depicts a processor 100 over successive processor resets 104a-104c. As shown, the processor 100 includes multiple cores 102a-102d. The cores 102a-102d are integrated within a single integrated circuit (IC) package (e.g., a LGA (Land Grid Array) or SiP (System in Package)). For example, the cores 102a-102d may be integrated on the same processor die or integrated on multiple processor dies included within the same IC package. Each core 102a-102d executes instructions of application programs. For example, the processor 100 architecture may enable the different cores 102a-102d to independently execute one or more application programs. To execute instructions, each core 102a-102d includes an ALU (Arithmetic Logic Unit), instruction decoder, and so forth.

As shown, the processor 100 boots a strict subset (i.e., less than all) of the cores 102a-102d in response to a given reset 104a-104c. For example, after reset 104a, the processor 100 boots cores 102a and 102b (labeled "ENABLED"), while in response to reset 104b, the processor boots cores 102c and 102d.

The cores 102a-102d booted in response to a given reset may be determined using a variety of core selection algorithms. For example, some algorithms may use non-volatile memory to track previous boot history (e.g., cores booted in the immediately previous reset, a set of previous resets, and/or a count of bootings per core over time). Others may implement algorithms not requiring previous boot history. For example, an algorithm may proceed in a predefined sequence of core sets where the core selection logic determines which set of cores to boot by accessing a lookup table or otherwise processing an indication of a location within the sequence. Alternately, a core selection algorithm may use a random number generator or some system variable to randomly determine a subset of cores to boot.

In the example shown, the selection algorithm chooses cores 102a-102d to minimize the number of successive boots to cores 102a-102d (e.g., core 102a does not boot twice in a row). That is, in the quad-core processor 100 shown, each successive reset boots either a first group of cores 102a-102b or, alternatingly, a mutually exclusive second group of cores 102c-102d. The core 102a-102d selection illustrated in FIG. 1 is merely an illustration, however, and other core selection algorithms would select different strict subsets of cores 102a-102d to boot including subsets that are not mutually exclusive between successive resets. Additionally, using some algorithms, the same strict subset of cores may be selected over some limited number of successive resets.

While the processor 100 of FIG. 1 included four cores 102a-102d, a multi-core processor using the core selection techniques described herein may have more than four cores or as few as two. The strict subset of cores booted may be a set of one core or may include multiple cores as shown in FIG. 1.

The core selection techniques can improve the performance of a processor 100 with respect to availability and reliability. That is, letting some cores "lie fallow" between resets reduces the on-time of each core, extending the overall life of processor 100, and extending the processor's 100 mean time to failure—vital characteristics for telecom applications, among others.

Oftentimes, a given processor 100 may include cores beyond the number purchased and licensed for use by a customer. For example, a quad core processor may be sold at a less expensive price as a dual core processor by disabling two of the cores. A core selection algorithm, however, may use all of the cores included in the IC package over different intra-reset periods, though limiting the number of booted cores at any one time so as not to exceed the number sold to the customer or some other maximum boot core value. For example, the processor 100 show in FIG. 1 may be sold as a dual core processor. Thus, more generally due to the core redundancy, an M-core processor that operates as an N-core processor (where M>N) would feature greater reliability and a longer life time than a processor having only N total cores by including the traditionally disabled cores in the core selection process.

As shown in FIG. 1, the core selection technique may select from all cores. However, over time, a given core may experience failure. Thus, the core selection process may maintain data in non-volatile memory used to exclude cores that have experienced failure from inclusion in a subset of cores to boot. For instance, such data may be a bit-vector where each respective bit indicates the boot-eligibility of each respective core. The core selection logic can then adapt its core selection by either booting a smaller number of cores, replacing a defective core in a subset with another core, or by implementing a different overall selection sequence. As an example, if core 102a failed, the core selection logic could change to a boot sequence that cycles through a first core subset of {102b, 102c}; a second core subset of {102c, 102d}; and a third core subset of {102b, 102d}, before repeating.

In some circumstances, such as an anticipated high-traffic period, the core selection logic can be configured to select all cores (i.e., not a strict subset) for one or more reset periods. Additionally, if necessary, additional cores can be dynamically enabled and booted beyond those initially booted after reset.

Figure 2:
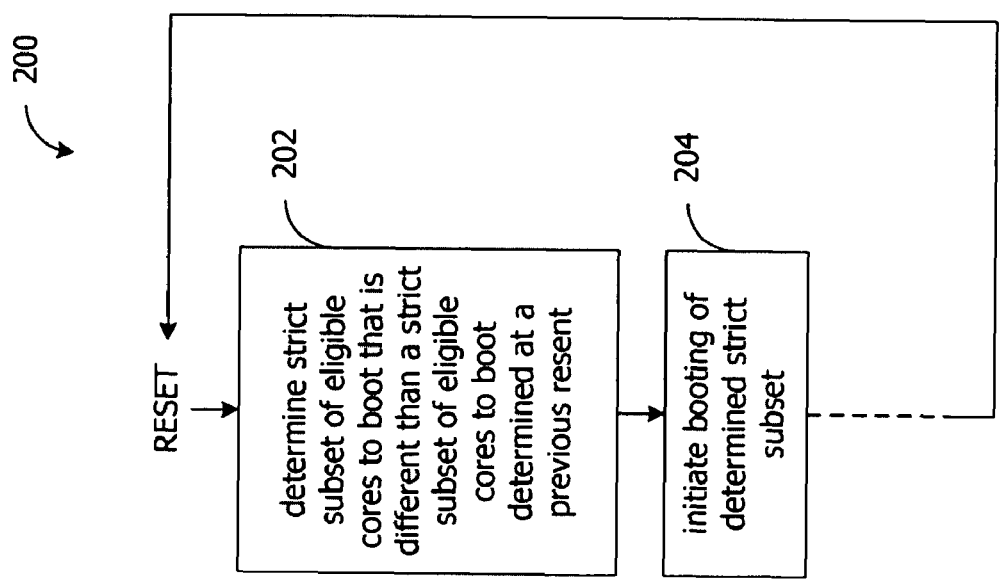
FIG. 2 is a flow chart of a process to determine strict subsets of processor cores to attempt to boot.

FIG. 2 is a flow chart of process 200 that includes core selection techniques. As shown, the process 200 determines 202 a strict subset of multiple processor cores from a set of multiple cores. As in the example illustrated in FIG. 1, a given core selection algorithm may, at times, determine a strict subset to boot that differs between immediately successive resets.

Core selection 202 may occur at different times. For example, core selection 202 may occur after a processor reset to determine the core(s) to boot-up. Alternately, core selection 202 may occur prior to reset and store identification of the core(s) to boot in non-volatile memory for use after the next reset.

As shown, the processor 100 initiates booting 204 of the strict subset of multiple processor cores. In an Intel Architecture (IA) processor, booting a core typically involves sending a core a startup signal (e.g., a SIPI message) that causes the core to execute BIOS (Basic Input/Output System) configuration code. Other architectures handle booting a core to a known, operational state differently. After booting, a core can execute application instructions until the next reset or the processor is powered down.

Figure 3:
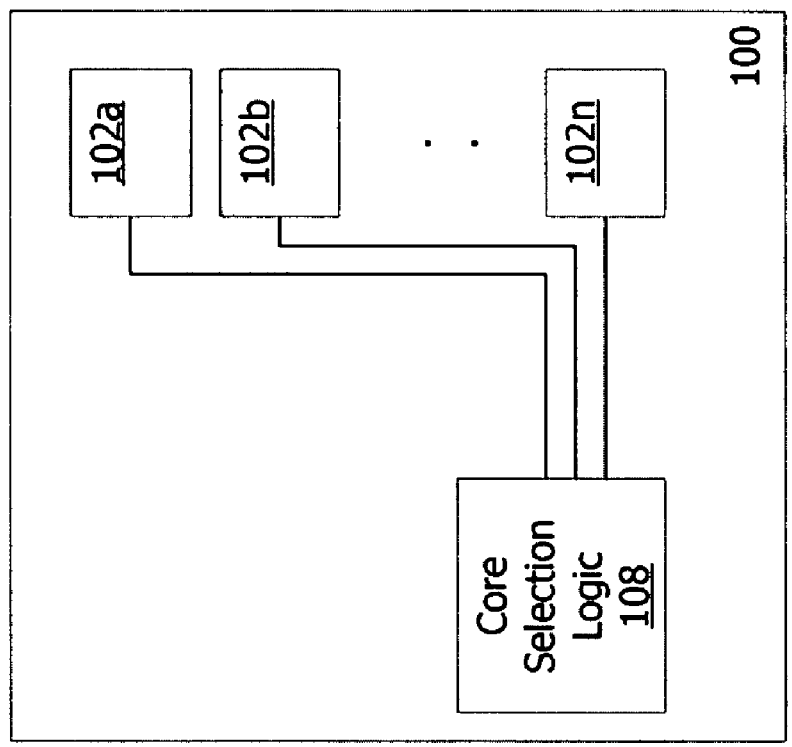
FIG. 3 is a diagram illustrating a processor having multiple cores.

The logic used to perform core selection may vary considerably in different implementations. For example, the logic may be instructions executed by a bootstrap (BSP) processor that selects application processors (AP) to boot. Alternately, as shown in FIG. 3, minimal circuitry 108 may be added to the processor 100 that both implements core selection algorithm(s) and, in response, either enables or disables core booting by controlling respective core selection lines connected between the cores 102a-102d and the logic 108. For example, the line may be ANDed with a clock signal provided to a core. The core selection logic 108 itself may also be enabled or disabled.

Figure 4:
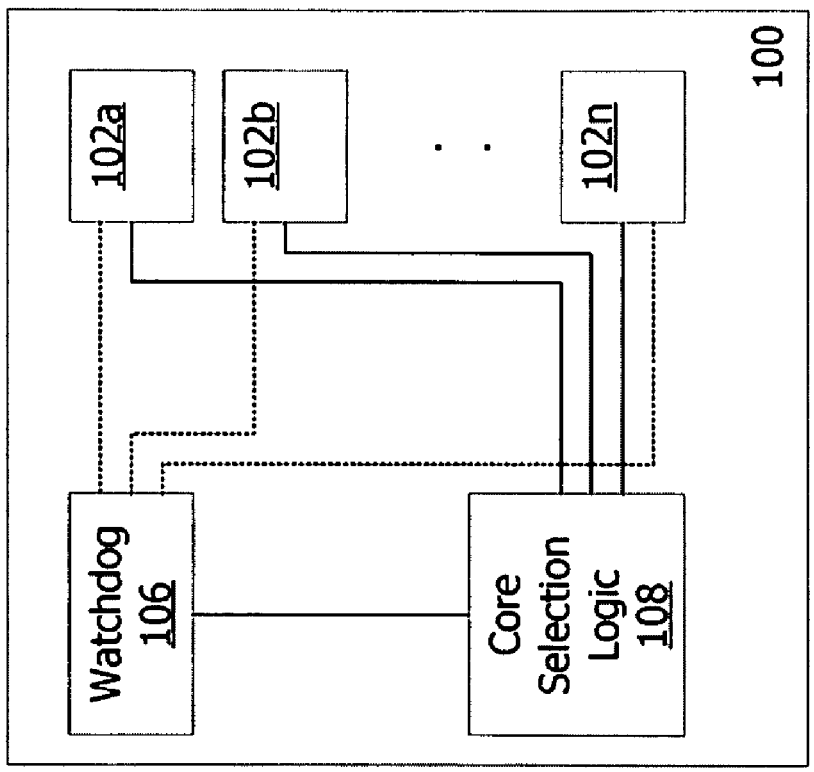
FIG. 4 is a diagram illustrating a processor having multiple cores.

FIG. 4 depicts a different implementation that features logic 106 (labeled "watchdog") to ensure selected cores are functional. The logic 106 can respond (e.g., initiate a system or processor reset) if a selected booting core does not function normally. For example, cores selected for booting may begin execution of a self-test piece of code. The code may instruct the booting core to notify the watchdog 106 of completion of the self-test. If the watchdog 106 does not receive notifications from each core in the set of cores within a given time period, the watchdog 106 can initiate a system and/or processor reset or identify an alternate core to boot. Additionally, the watchdog 106 can cause storage of data excluding a failing core from inclusion in future core subsets in memory of the core selection logic or elsewhere in the processor 100.

In addition to processor life-span, another characteristic of reliable systems is fault-tolerance: the ability to detect failure (fault detection) and respond (fault correction). Logic 108, or a boot-strap processor, may also control fault-tolerant features. For example, lock-stepping is one method commonly used to implement a fault tolerant system. This method uses identical sets of resources (one or more processor cores) to execute the same code as the primary resource (one or more processor cores) with compare logic (hardwired or programmable circuitry) to monitor the outputs of multiple sets of resources to make a determination if one of the set of resources has failed. Once the compare logic has detected a failed set of resources, it may then disable the failed set of resources and their outputs and select an alternate set of resources and corresponding outputs to enable, or attempt to correct the failure, or simply take some action to notify an entity (logic or operator) of the failure. For example, logic 108 may include cores 102a and 102b as a lock-step pair. Additionally, cores that have been detected as failed may be excluded from inclusion in a set of cores selected for future booting by a core selection algorithm. There are other commonly used techniques to implement fault tolerant systems (e.g., message passing between cores) that could be used instead of lock-step.

Potentially, the fault tolerant features and the core selection techniques described above may be mutually exclusive. For example, a processor may be configured to operate either in core selection mode, which can extend processor/core lifetime by reducing overall core on-time, or fault-tolerant mode (e.g., lock-stepping mode) which features core execution redundancy and fail-safe execution at the cost of increase on-time for individual cores. Such selection may be preformed, for example, via a graphical user interface, command line interface, or hardware configuration of the processor. Alternately, different fault-tolerant and core selection techniques can be configured in a way that is not mutually exclusive (e.g., lock-stepping with cores in a strict subset of cores determined by a core selection algorithm).

A processor featuring the core selection techniques described above would be particularly valuable in HA/HR (High Availability/High Reliability) applications such as those used in telecom systems. For example, the cores described above may execute programs that handle forwarding or other processing of packets across a network that include payloads that feature voice signals of telephonic applications. Such a processor may be included in a line card (e.g., an ATCA (Advanced Telecommunications Computing Architecture) line card) for insertion into a chassis that switches data between different line cards. Such a processor may also be included in a server blade for insertion into a server chassis. A processor featuring the core selection techniques described above would also be particularly valuable in fault tolerant systems as required for military, medical, automotive, or other life critical applications. For example, such a processor may be included in a drive-by-wire automotive application, where a failure may result in catastrophic injuries or loss of life.

A variety of aspects of logic 108 (or a bootstrap processor) can be configured. For example, configuration data or a user interface may permit a user or remote system to control the core selection algorithm used, whether or not lock-stepping is used, and/or control the use of other capabilities described herein.

The logic described above may include a variety of circuitry such as hardwired circuitry, digital circuitry, analog circuitry, programmable circuitry, and so forth. The programmable circuitry may operate on program instructions or firmware that form part of the logic.

Other embodiments are within the scope of the following claims.

What is claimed is:

1. A method, comprising:
   determining a first strict subset of multiple processor cores from a first set of multiple functional processor cores integrated within a single integrated circuit package, the determined first strict subset of multiple processor cores differing from a second, previously determined strict subset of multiple processor cores from a second set of multiple functional processor cores used to initiate an immediately previous core booting; and in response to a processor reset, initiating booting of the first strict subset of multiple processor cores; and wherein a one of the multiple processor cores is in both the first set of multiple functional processor cores and the second set of multiple functional processor cores, and wherein the one of the multiple processor cores is in the first strict subset of multiple processor cores but is not in the second strict subset of multiple processor cores.

2. The method of claim 1, wherein the first determined strict subset of multiple processor cores comprises multiple processor cores.

3. The method of claim 1, wherein the determining the first strict subset of the multiple processor cores comprises accessing non-volatile memory to determine processor cores previously booted.

4. The method of claim 1, wherein the determining the first strict subset of the multiple processor cores comprises determining ones of the multiple processor cores eligible for inclusion in the first strict subset.

5. The method of claim 1, further comprising:

in response to determining that at least one of the multiple processor cores in a strict subset of multiple processor cores failed in functionality, initiating a reset of the processor.

6. The method of claim 1, further comprising, storing an indication in non-volatile memory that a one of the processor cores that failed in functionality is not eligible for inclusion in a subsequent strict subset of multiple processor cores.

7. The method of claim 6, wherein the determining whether at least one of the multiple processor cores failed in functionality comprises:

executing test code at a core; and verifying correct execution of the test code.

8. The method of claim 1, wherein a number of unique cores included in strict subsets across successive resets exceeds a number stored in memory indicating the maximum number of cores to boot; and wherein the number of unique cores included in any strict subset does not exceed the number indicating the maximum number of cores to boot.

9. The method of claim 1, further comprising receiving a configuration for the processor to operate in only one of (1) a fault tolerant mode that includes redundant core execution of a program or (2) a core selection mode that selects a strict subset of the multiple processor cores to initiate booting.

10. The method of claim 1, wherein the determining the first strict subset of multiple processor cores from the first set of multiple functional processor cores integrated within the single integrated circuit package comprises accessing a stored sequence of core sets to boot and determining a location within the sequence.

11. The method of claim 1, wherein the determining the first strict subset of multiple processor cores from the first set of multiple functional processor cores integrated within the single integrated circuit package comprises determining mutually exclusive sets of cores across successive boot sequences based on data identifying cores previously booted and wherein the first strict subset of multiple processor cores comprises multiple processor cores.

12. The method of claim 1, wherein the determining the first strict subset of multiple processor cores from the set of multiple functional processor cores integrated within the single integrated circuit package comprises using output of a random number to select cores.

13. An integrated circuit (IC) package, comprising:

multiple processor cores integrated within the IC package;

logic integrated within the IC package to:

determine a first strict subset of multiple processor cores from a first set of multiple functional processor cores integrated within a single integrated circuit package, the determined first strict subset of multiple processor cores differing from a second, previously determined strict subset of multiple processor cores from a second set of multiple functional processor cores used to initiate an immediately previous core booting; and in response to a processor reset, initiate booting of the first strict subset of multiple processor cores; and wherein the logic is configured to operate such that a one of the multiple processor cores is in both the first set of multiple functional processor cores and the second set of multiple functional processor cores, and wherein the one of the multiple processor cores is in the first strict subset of multiple processor cores but is not in the second strict subset of multiple processor cores.

14. The IC package of claim 13, wherein the logic integrated within the IC package to determine the first strict subset of the multiple processor cores comprises logic to access non-volatile memory to determine at least one set of multiple processor cores included in a previously determined strict subset of multiple processor cores.

15. The IC package of claim 13, wherein the logic integrated within the IC package to determine the first strict subset of the multiple processor cores comprises logic to determine ones of the multiple processor cores eligible for inclusion in the strict subset.

16. The IC package of claim 13, wherein the logic integrated within the IC package comprises logic to store an indication in non-volatile memory that at least one of one of the multiple processor cores in strict subset of multiple processor cores that failed in functionality is not eligible for inclusion in a subsequent strict subset of multiple processor cores.

17. The IC package of claim 13, wherein the logic integrated within the IC package comprises logic circuitry having a signal line coupled to each of the multiple processor cores.

18. The IC package of claim 13, further comprising logic to receive signals from processor cores included in the determined strict subset and to identify core failure if a signal is not received from a core in the determined strict subset.

19. The IC package of claim 13, wherein IC package comprises logic to receive a configuration to operate in only one of (1) a fault tolerant mode that includes redundant core(s) execution of a program or (2) a core selection mode that selects a strict subset of the multiple processor cores to initiate booting.

* * * * *